United States Patent
Kim et al.

(10) Patent No.: US 10,654,473 B2
(45) Date of Patent: May 19, 2020

(54) COLLISION PREVENTION APPARATUS AND COLLISION PREVENTING METHOD

(71) Applicant: MANDO CORPORATION, Pyeongtaek-si, Gyeonggi-do (KR)

(72) Inventors: Jae Suk Kim, Yongin-si (KR); Tae Bong Noh, Yongin-si (KR)

(73) Assignee: MANDO CORPORATION, Pyeongtaek-si, Gyeonggi-Do (KR)

(*) Notice: Subject to any disclaimer, the term of this patent is extended or adjusted under 35 U.S.C. 154(b) by 0 days.

(21) Appl. No.: 15/476,707

(22) Filed: Mar. 31, 2017

(65) Prior Publication Data

US 2017/0282915 A1 Oct. 5, 2017

(30) Foreign Application Priority Data

Apr. 1, 2016 (KR) .................... 10-2016-0040012

(51) Int. Cl.
*B60W 30/09* (2012.01)
*B60W 10/18* (2012.01)
*B60W 50/14* (2020.01)

(52) U.S. Cl.
CPC ............ *B60W 30/09* (2013.01); *B60W 10/18* (2013.01); *B60W 50/14* (2013.01);
(Continued)

(58) Field of Classification Search
CPC .................................................. B60W 30/09
See application file for complete search history.

(56) References Cited

U.S. PATENT DOCUMENTS

| 5,754,123 A | * | 5/1998 | Nashif | ................... | B60Q 9/007 |
| | | | | | 340/435 |
| 2007/0279199 A1 | * | 12/2007 | Danz | ..................... | B60Q 9/006 |
| | | | | | 340/435 |

(Continued)

FOREIGN PATENT DOCUMENTS

CN            104859538 A        8/2015

OTHER PUBLICATIONS

Office Action issued in corresponding Chinese Application No. 201710218435.7, dated Jan. 24, 2019.

*Primary Examiner* — Imran K Mustafa
(74) *Attorney, Agent, or Firm* — Morgan, Lewis & Bockius LLP (57) ABSTRACT

Disclosed is an apparatus for preventing a collision. The apparatus includes: a detection unit configured to detect another vehicle located at a rear side of both lateral sides through a detection sensor including one or more radar sensors disposed at a rear side of a driver's vehicle to monitor the rear side of both lateral sides and one or more ultrasonic sensors disposed at the rear side of the driver's vehicle to monitor the rear side of both lateral sides; a determination unit configured to determine a movement direction of the other vehicle based on the location, select the other vehicle that moves in one direction including a transverse direction from the driver's vehicle as a target vehicle, and determine whether the target vehicle approaches or moves away from the driver's vehicle by tracking a driving trace of the target vehicle; and a controller configured to, when it is determined that the target vehicle approaches the driver's vehicle, select a fusion target vehicle based on track information of the other vehicle by output values of the radar sensors and distance information of the other vehicle by output values of the ultrasonic sensors, calculate a time of collision with the fusion target vehicle (Continued)

and, when the collision time is within a preset threshold time, make a control to operate one or more of a warning display device, an alarm output device, and a braking system.

13 Claims, 7 Drawing Sheets

(52) U.S. Cl.
CPC . *B60W 2050/143* (2013.01); *B60W 2050/146* (2013.01); *B60W 2420/52* (2013.01); *B60W 2420/54* (2013.01); *B60W 2550/10* (2013.01)

(56) References Cited

U.S. PATENT DOCUMENTS

| | | | |
|---|---|---|---|
| 2015/0109444 A1* | 4/2015 | Zhang | B60Q 9/008 348/148 |
| 2016/0272115 A1* | 9/2016 | Max | B60Q 9/006 |
| 2017/0057474 A1* | 3/2017 | Zeng | B60T 7/22 |

* cited by examiner

COLLISION PREVENTION APPARATUS AND COLLISION PREVENTING METHOD

CROSS REFERENCE TO RELATED APPLICATION

This application claims priority from Korean Patent Application No. 10-2016-0040012, filed on Apr. 1, 2016, which is hereby incorporated by reference for all purposes as if fully set forth herein.

BACKGROUND OF THE INVENTION

1. Field of the Invention

The present invention relates to a collision preventing technology capable of preventing collision of a vehicle driving backward. Particularly, the present invention relates to a technology capable of preventing a collision that may occur in a process of pulling out a perpendicularly parked vehicle.

2. Description of the Prior Art

In general, a rear collision warning device is a device that detects whether there is a rear obstacle and informs a driver of the existence of the obstacle through an alarm or an indication light when the driver backs up the vehicle, and corresponds to a device for user's convenience that is conveniently used when the driver parks the vehicle within a narrow space or backs up the vehicle at night.

The rear collision warning device includes a plurality of ultrasonic sensors for detecting obstacles located at the rear side of the vehicle.

The ultrasonic sensors are configured to transmit and receive ultrasonic waves according to a pulse signal input when the driver backs up the vehicle and may be arranged and installed in a bumper of the vehicle at predetermined intervals to handle predetermined rear areas of the vehicle.

Further, each ultrasonic sensor transmits an ultrasonic wave of a predetermined frequency and also receives an ultrasonic wave reflected and returned by the obstacle, and thus includes an ultrasonic transmitter and an ultrasonic wave receiver.

Through such an operation of the ultrasonic sensor, the rear collision warning device stores a difference between an ultrasonic transmission time and an ultrasonic detection time through a timer, determines a distance from the obstacle, and performs an operation of warning the driver when the vehicle reaches a set distance.

However, the ultrasonic sensor has a disadvantage in that a distance that can be detected by the ultrasonic sensor is short. Due to such a characteristic, the rear collision warning device using only the ultrasonic sensor has a limitation in that a collision with an object that moves only within a limited distance can be warned of. Accordingly, the conventional rear collision warning device may generate a problem of not warning of a collision with another vehicle that moves toward the driver's vehicle at a high speed.

SUMMARY OF THE INVENTION

An aspect of the present invention is to prevent a collision with an object that moves in the rear of the driver's vehicle.

In accordance with an aspect of the present invention, an apparatus for preventing a collision is provided. The apparatus includes: a detection unit configured to detect another vehicle located at a rear side of both lateral sides through a detection sensor including one or more radar sensors disposed at a rear side of a driver's vehicle to monitor the rear side of both lateral sides and one or more ultrasonic sensors disposed at the rear side of the driver's vehicle to monitor the rear side of both lateral sides; a determination unit configured to determine a movement direction of the other vehicle based on the detected location, select the other vehicle that moves in one direction including a transverse direction from the driver's vehicle as a target vehicle, and determine whether the target vehicle approaches or moves away from the driver's vehicle by tracking a driving trace of the target vehicle; and a controller configured to, when it is determined that the target vehicle approaches the driver's vehicle, select a fusion target vehicle based on track information of the other vehicle by output values of the radar sensors and distance information of the other vehicle by output values of the ultrasonic sensors, calculate a time of collision with the fusion target vehicle and, when the collision time is within a preset threshold time, make a control to operate one or more of a warning display device, an alarm output device, and a braking system.

In accordance with another aspect of the present invention, a method of preventing collision is provided. The method include: detecting another vehicle located at a rear side of both lateral sides through a detection sensor including one or more radar sensors disposed at a rear side of a driver's vehicle to monitor the rear side of both lateral sides and one or more ultrasonic sensors disposed at the rear side of the driver's vehicle to monitor the rear side of both lateral sides; determining a movement direction of the other vehicle based on the detected location; selecting the other vehicle that moves in one direction including a transverse direction from the driver's vehicle as a target vehicle and determining whether the target vehicle approaches or moves away from the driver's vehicle by tracking a driving trace of the target vehicle; when it is determined that the target vehicle approaches the driver's vehicle, selecting a fusion target vehicle based on track information of the other vehicle by output values of the radar sensors and distance information of the other vehicle by output values of the ultrasonic sensors, and calculating a time of collision with the fusion target vehicle; and when the collision time is within a preset threshold time, making a control to operate one or more of a warning display device, an alarm output device, and a braking system.

According to the present invention as described above, there is an effect of preventing a collision with an object moving at a high speed by detecting a wide range through radar sensors and ultrasonic sensors.

Further, the present invention has an effect of accurately selecting a target based on track information of another vehicle by output values of the radar sensors and distance information of the other vehicle by output values of the ultrasonic sensors, accurately calculating a time of collision with the target, and accurately controlling a driver's vehicle, so as to prevent a collision with an object moving from the rear side.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1:
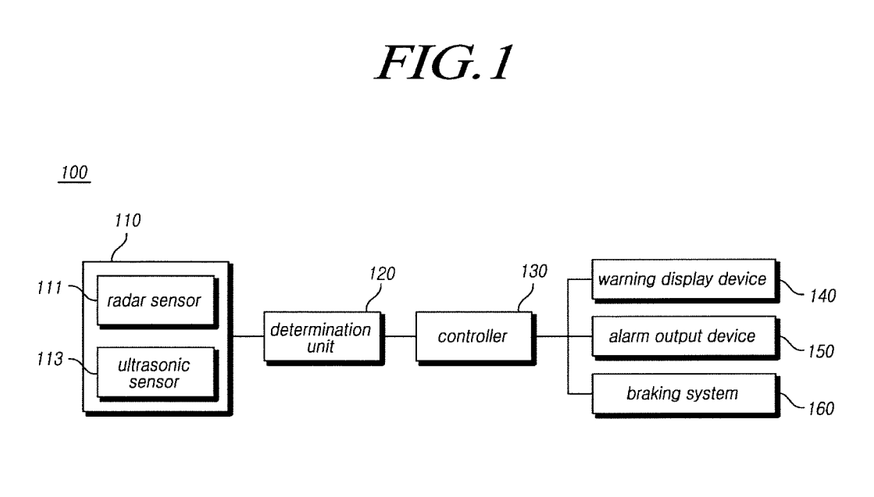
FIG. 1 illustrates a configuration of a collision preventing apparatus according to an embodiment of the present invention.

FIG. 1 illustrates a configuration of a collision preventing apparatus according to an embodiment of the present invention.

Referring to FIG. 1, a collision preventing apparatus 100 may include a detection unit 110 for detecting another vehicle located at a rear side of both lateral sides by using a detection sensor including one or more radar sensors 111 disposed at a rear side of a driver's vehicle to monitor the rear side of both lateral sides thereof and using one or more ultrasonic sensors 113 disposed on a rear side of the driver's vehicle to monitor the rear side of both lateral sides thereof, a determination unit for determining a movement direction of the other vehicle based on the detected location, selecting the other vehicle that moves in one direction including a transverse direction from the driver's vehicle as a target vehicle, and determining whether the target vehicle approaches or moves away from the driver's vehicle by tracking a driving trace of the target vehicle, and a controller 130 for, when it is determined that the target vehicle approaches the driver's vehicle, selecting a fusion target vehicle by fusing track information of the other vehicle by output values of the radar sensors and distance information of the other vehicle by output values of the ultrasonic sensors, calculating a time of collision with the fusion target vehicle and, when the time of collision is within a preset threshold time, making a control to operate a warning display device 140, an alarm output device 150, or a braking system 160.

The radar sensor 111 is a device that may transmit an electromagnetic wave and analyzes an electromagnetic wave reflected and returned by an object, so as to measure a distance from the object. When the radar sensors 111 use a low frequency having a long wavelength, propagation attenuation is small and a remote search is possible, but accurate measurement is not possible, so that a resolution becomes bad. However, when the radar sensors 111 use a high frequency having a short wavelength, propagation attenuation is large due to easy absorption in or reflection from vapor in the air, snow, rain, and the like, so that a remote search is not possible but a high resolution can be acquired. According to such characteristics, when it is required to quickly discover a remote target through an air radar or a ground radar, radio waves of a low frequency are used. However, when it is required to precisely measure a form or a size of a target through a fire-control radar, radio waves of a high frequency are used.

The ultrasonic sensors 113 are devices that may have difficulty in generating a diffraction phenomenon and easily create a shadow of an object due to a characteristic that a wavelength becomes shorter as the number of vibrations becomes larger, and may detect a distance, a location, and a direction of the object based on a characteristic of ultrasonic waves evenly transferred in one direction such as light. In order to detect a distance, the ultrasonic sensors 113 may detect a distance from an object based on a time taken for ultrasonic waves of a pulse waveform to be transmitted and then returned.

The detection unit 110 according to an embodiment of the present invention may be installed with the radar sensor 111 and the ultrasonic sensor 113 that may operate as described above in the rear surface of the driver's vehicle to detect the rear of both sides, so as to detect another vehicle approaching the driver's vehicle in the rear of both sides.

However, the rear of both sides detected by the radar sensor 111 and the ultrasonic sensor 113 may be designed to use the output value of the radar sensor 111 and the output value of the ultrasonic sensor 113 in a later process.

The aforementioned detection unit 110 will be described in more detail with further reference to FIG. 2.

Figure 2:
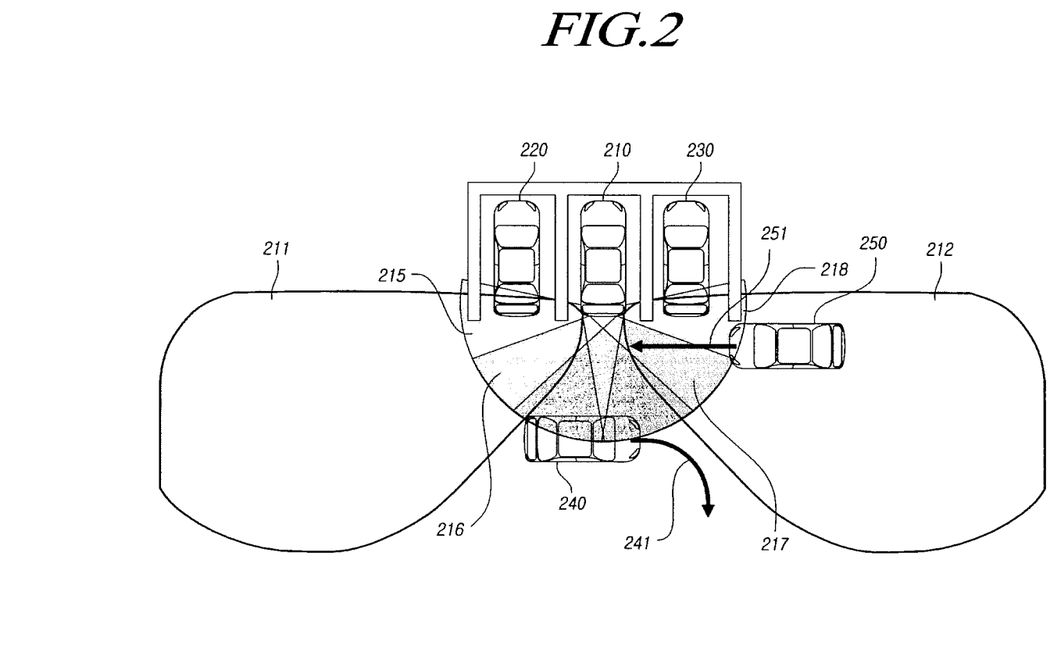
FIG. 2 illustrates an example for describing an operation of the collision preventing apparatus according to an embodiment of the present invention.

FIG. 2 illustrates an example for describing an operation of the collision preventing apparatus according to an embodiment of the present invention.

FIG. 2 illustrates a situation where a driver's vehicle 210 is perpendicularly head-on parked between other perpendicularly head-on parked vehicles 220 and 230, wherein the driver's vehicle 210 uses two radar sensors 111 installed at the rear side of both lateral sides of the driver's vehicle 210 to monitor the rear side of one lateral side 211 and the rear side of the other lateral side 212, and uses four ultrasonic radars 113 installed at the rear side of both lateral sides to monitor a first lateral rear side 215, a second lateral rear side 216, a third lateral rear side 217, and a fourth lateral rear side 218. Further, FIG. 2 also illustrates a situation where the other vehicle 240 having a rotation movement 241 from the left side to the rear side and the other vehicle 250 having a linear movement 251 from the right side to the left side exist.

Referring to FIG. 2, the rear side of one lateral side 211 or the rear side of the other lateral side 212 corresponding to the area monitored by one radar sensor 111 may be more remote than the first lateral rear side 215, the second lateral rear side 216, the third lateral rear side 217, or the fourth lateral rear side 218 corresponding to the area monitored by one ultrasonic sensor 113, but may be narrower. The radar sensors 111 have a limitation in that a non-detected short-distance area may occur since the radar sensors 111 have an excellent detection performance for a remotely located object but may generate a large error for a closely located object.

In contrast, the ultrasonic sensors 113 may have a characteristic opposite to the characteristic of the radar sensors 111. Based on the characteristics, the aforementioned limitation can be compensated for through the installation of the two radar sensors 111 to monitor the rear side of one lateral side 211 and the rear side of the other lateral side 212 and the installation of the four ultrasonic sensors 113 to monitor the first lateral rear side 215, the second lateral rear side 216, the third lateral rear side 217, and the fourth lateral rear side 218 as illustrated in FIG. 2. The two radar sensors 111 may be installed and the four ultrasonic sensors 114 may be installed as illustrated, but the present invention is not limited thereto. That is, three or more radar sensors rather than the two radar sensors 111 may be used, and two or more ultrasonic sensors rather than the four ultrasonic sensors 113 may be used.

The detection unit 110 may detect the existence and location of other vehicles 240 and 250 through the radar sensors 111 and the ultrasonic sensors 113.

The determination unit 120 according to an embodiment of the present invention may determine a movement direction of another detected vehicle based on a location of the other vehicle detected by the detection unit 110, select another vehicle that moves in one direction including a transverse direction from the driver's vehicle as a target vehicle, and determine whether the selected target vehicle approaches or moves away from the driver's vehicle by tracking a driving trace of the target vehicle.

Referring back to FIG. 2, the determination unit 120 may determine movement directions of the other vehicles 240 and 250 based on the locations of the detected other vehicles 240 and 250. Specifically, the detection unit 110 may detect the locations of the first vehicle 240 and the second vehicle 250 at every operation time of the used radar sensors 111 and ultrasonic sensors 113. Accordingly, the determination unit 120 may determine the movement direction of the detected first vehicle 240 and the movement direction of the second vehicle 250.

Thereafter, the determination unit 120 may select the first vehicle 240 and the second vehicle 250 that move in one direction including the transverse direction from the driver's vehicle 210 as target vehicles based on the determined movement directions 241 and 251. Although FIG. 2 illustrates only the other vehicles 240 and 250 moving in one direction, there may be another vehicle moving in a direction (a longitudinal direction from the driver's vehicle) other than the one direction.

Further, the determination unit 120 may determine whether the first target vehicle 240 and the second vehicle 250 approach or move away from the driver's vehicle 210 by tracking the driving trace 241 of the selected first target vehicle 240 and the driving trace 251 of the second target vehicle 250. That is, the determination unit 120 may determine that the first target vehicle 240 moves away from the driver's vehicle and the second target vehicle 250 approaches the driver's vehicle.

Alternatively, the determination unit 120 may determine whether the other vehicles 240 and 250 approach or move away from the driver's vehicle 210 based on relative speeds of the other vehicles 240 and 250 calculated based on the locations of the other vehicles 240 and 250. For example, when the relative speed of the first vehicle 240 moving in another direction different from the direction of the driver's vehicle 210 is positive, the determination unit may determine that the first vehicle 240 moves away from the driver's vehicle. When the relative speed of the second vehicle 250 moving toward the driver's vehicle 210 is positive, the determination unit 120 may determine that the second vehicle 250 approaches the driver's vehicle 210.

When it is determined that the target vehicle approaches the driver's vehicle, the controller 130 according to an embodiment of the present invention may select a fusion target vehicle by fusing track information of another vehicle by output values of the radar sensor 111 and distance information of the other vehicle by output values of the ultrasonic sensors 113, calculate a time of collision with the fusion target vehicle, and, when the time of collision is within a preset threshold time, make a control to operate a warning display device, an alarm output device, or a braking system.

The track information of the other vehicle uses the output values of the radar sensors 111 and the distance information of the other vehicle uses the output values of the ultrasonic sensors 113, but the present invention is not limited thereto. The controller 130 may select a target vehicle, of which track information is toward the driver's vehicle and of which distance information is within a predetermined distance from the driver's vehicle, as the fusion target vehicle.

Referring back to FIG. 2, the controller 130 may fuse the track information of the second vehicle 250 by the output values of the radar sensors 111 and the distance information of the second vehicle 250 by the output values of the ultrasonic sensors 113 and select the second vehicle 250 as the fusion target vehicle.

The fusion target vehicle may be accurately detected according to the use of the output values of the radar sensors 111 and the output values of the ultrasonic sensors 113.

Accordingly, the controller 130 may more accurately calculate the time of collision with the selected fusion target vehicle 250 and, when the time of collision with the fusion target vehicle 250 is within a preset threshold time, make a control to operate a warning display device, an alarm output device, or a braking system included in the driver's vehicle 210. The threshold time may be a time during which the parked driver's vehicle 210 is pulled out.

For example, when the calculated time of collision is within the threshold time due to a movement of the fusion target vehicle 250 at a high speed, the controller 130 may inform the driver of the driver's vehicle 210 that there is a risk of collision with the other vehicle 250 by making a control to operate the warning display device 140 or the alarm output device 150. Alternatively, the controller 130 may make a control to operate the braking system 160 so that the driver's vehicle 210 cannot be pulled out.

More specifically, the controller 130 may calculate a time of collision with the fusion target vehicle 250 with respect to a longitudinal direction (a forward and backward direction of the driver's vehicle 210) from the driver's vehicle 210 and a time of collision with the fusion target vehicle 250 with respect to a transverse direction (a direction perpendicular to the longitudinal direction). When the time of collision with the fusion target vehicle 250 with respect to the longitudinal direction is within a longitudinal threshold time and the time of collision with the fusion target vehicle 250 is within a transverse threshold time, the controller 130 may make a control to operate the warning display device 140, the alarm output device 150, or the braking system 160.

Further, when controlling the operation of the warning display device 140, the alarm output device 150, or the braking system 160, the controller 130 may decide an order of the warning display device 140, the alarm output device 150, and the braking system 160.

For example, the controller 130 may make a control to operate the warning display device 140 when the calculated time of collision is within a preset first threshold time, make a control to operate the alarm output device 150 when the time of collision is within a second threshold time shorter than the first threshold time, and make a control to operate the braking system 160 when the time of collision is within a third threshold time shorter than the second threshold time. The first threshold time, the second threshold time, and the third threshold time correspond to times set according to a risk of collision with another vehicle, wherein the first threshold time may have a low collision risk and the third threshold time may have a high collision risk.

The warning display device 140 corresponds to a device for providing a visual notification to a driver and passengers of the vehicle and may be a lamp giving a light source or a display that may provide an image, the alarm output device 150 may be a device for providing an auditory notification to the driver and passengers of the vehicle, and the braking system 160 corresponds to a device for reducing a speed of the vehicle and may be a brake Further, prior to the operation of the collision preventing apparatus 100 according to an embodiment of the present invention described above, the collision preventing apparatus 100 may detect a gear of the driver's vehicle through a gear sensor included in the driver's vehicle and a speed of the driver's vehicle through a vehicle speed sensor. Then, a reverse gear may be detected, and, when the speed of the driver's vehicle is equal to or lower than a preset threshold speed, the collision preventing apparatus 100 according to an embodiment of the present invention may operate.

This is to operate the collision preventing apparatus 100 according to an embodiment of the present invention only when the driver's vehicle moves backwardly (including a case where the head-on parked driver's vehicle is pulled out).

That is, when the rear gear is engaged and a forward speed is equal to or lower than 0, it may be determined that the driver's vehicle is being reversed and thus the collision preventing apparatus 100 according to an embodiment of the present invention may operate.

As described above, the collision preventing apparatus 100 according to the present invention has an effect of preventing a collision with another moving vehicle during a process in which the head-on parked driver's vehicle is pulled out.

Hereinafter, an operation of the collision preventing apparatus 100 according to the present invention will be described in detail with reference to FIGS. 3 to 6.

Figure 3:
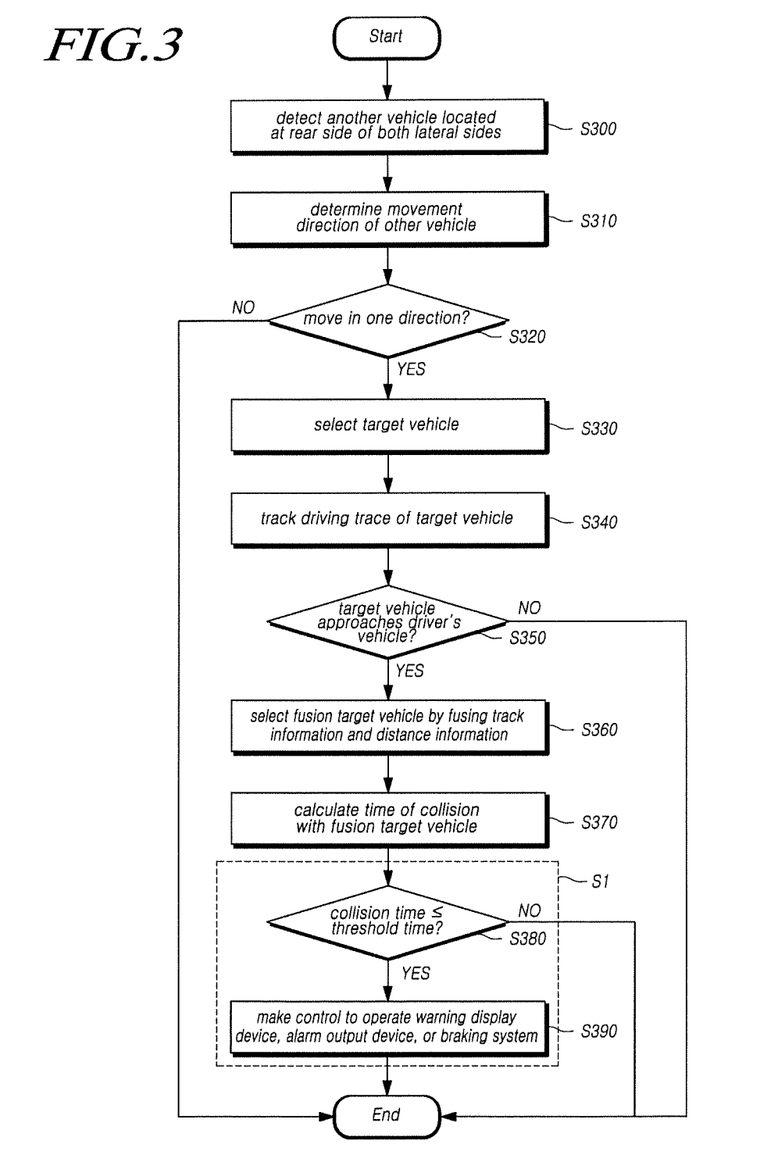
FIG. 3 illustrates another example for describing the operation of the collision preventing apparatus according to an embodiment of the present invention.

FIG. 3 illustrates another example for describing the operation of the collision preventing apparatus according to an embodiment of the present invention.

Referring to FIG. 3, the detection unit of the collision preventing apparatus according to an embodiment of the present invention may detect another vehicle located at the rear side of both lateral sides by using a detection sensor including one or more radar sensors disposed at the rear side of the driver's vehicle to monitor the rear side of both lateral sides and one or more ultrasonic sensors disposed on the rear side of the driver's vehicle to monitor the rear side of both lateral sides in S300.

For example, the detection unit may detect the other vehicle located at the rear side of both lateral sides through the two radar sensors installed to monitor the rear side of one lateral aide 211 and the rear side of the other lateral side 212 and the four ultrasonic sensors installed to monitor the first lateral rear side 215, the second lateral rear side 216, the third lateral rear side 217, and the fourth lateral rear side 218 as illustrated in FIG. 2.

When the other vehicle is detected through step S300, the determination unit according to an embodiment of the present invention may determine a movement direction of the other vehicle based on a located of the other detected vehicle in S310.

Specifically, the radar sensors and the ultrasonic sensors may detect a location (x, y) of another vehicle at every operation time. x and y of the location may be different directions depending on settings and, hereinafter, only a longitudinal direction and a transverse direction of the driver's vehicle will be described for convenience of the description. A change only in an x value of the location of the other vehicle detected at every operation time may refer to a longitudinal movement of the other corresponding vehicle, a change only in a y value may refer to a transverse movement of the other corresponding vehicle, and changes in both the x value and the y value may refer to the longitudinal and transverse movements of the other corresponding vehicle.

Thereafter, the determination unit may determine whether the movement direction of the other vehicle determined in step S310 corresponds to one direction including a transverse direction in S320.

When it is determined that the movement direction of the other vehicle corresponds to one direction including the transverse direction (YES) in step S320, the determination unit may select the other vehicle as a target vehicle in S330.

Thereafter, the determination unit may track a driving trace of the selected target vehicle in S340. The driving trace may be made along the location of the other vehicle detected at every operation time in S300.

Thereafter, the determination unit may determine whether the target vehicle approaches the driver's vehicle based on the driving trace tracked in step S340 in S350.

For example, when the tracked driving trace heads for the driver's vehicle, it may be determined that the target vehicle approaches the driver's vehicle. Unlike this, when the tracked driving trace does not head for the driver's vehicle, it may be determined that the target vehicle does not approach the driver's vehicle (that is, moves away from the driver's vehicle).

Unlike step S350, the determination unit may determine whether the target vehicle approaches the driver's vehicle based on a relative speed of the other vehicle calculated based on the location of the target vehicle detected in step S300.

For detailed example, when a relative speed of a first other vehicle that moves in another direction, which is not a direction toward the driver's vehicle, is positive, the determination unit may determine that the first other vehicle moves away from the driver's vehicle. When a relative speed of a second other vehicle that moves toward the driver's vehicle is positive, the determination unit may determine that the second other vehicle approaches the driver's vehicle.

When it is determined that the target vehicle approaches the driver's vehicle (YES) in S350, the controller according to an embodiment of the present invention may select a fusion target vehicle by fusing track information of the other vehicle by output values of the radar sensors and distance information of the other vehicle by output values of the ultrasonic sensors in S360.

The track information of the other vehicle uses the output values of the radar sensors based on a characteristic of the radar sensors corresponding to a remote detection, and the distance information of the other vehicle uses the output values of the ultrasonic sensors based on a characteristic of the ultrasonic sensors 113 corresponding to an accurate detection of a short-distance object, but the present invention is not limited thereto. Accordingly, the controller 130 may select a target vehicle, of which the track information of the other vehicle corresponds to a direction toward the driver's vehicle and of which the distance information of the other vehicle is within a predetermined distance from the driver's vehicle, as a fusion target vehicle.

Thereafter, the controller may calculate a time of collision with the selected fusion target vehicle in S370.

This will be described in detail with reference to FIG. 4.

Figure 4:
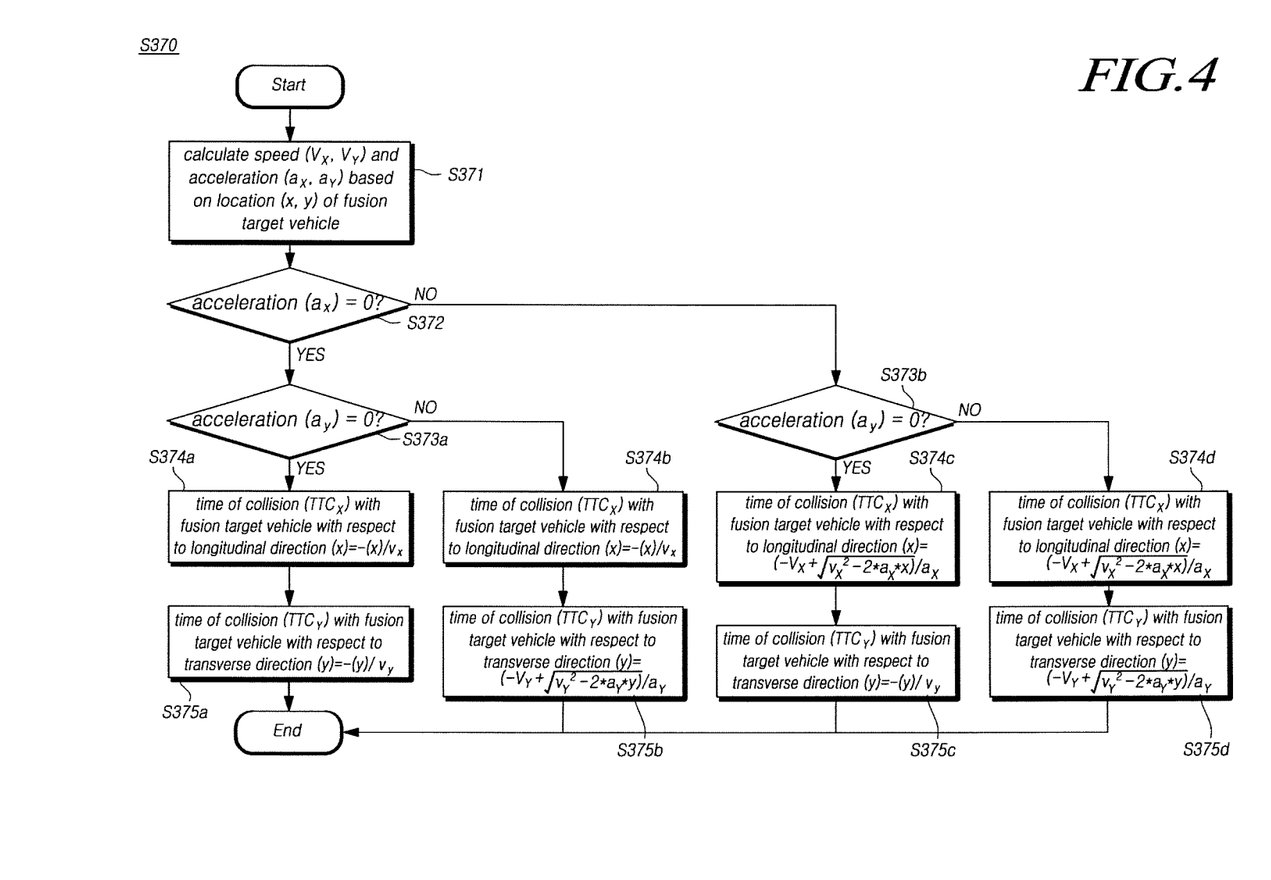
FIG. 4 illustrates an example for describing an operation of a controller according to an embodiment of the present invention.

FIG. 4 illustrates an example for describing an operation of the controller according to an embodiment of the present invention.

Referring to FIG. 4, the controller may calculate a speed ($v_X$, $v_Y$) and an acceleration ($a_X$, $a_Y$) of the fusion target vehicle based on the location (x, y) of the fusion target vehicle. More specifically, the controller may calculate a movement distance of the fusion target vehicle for an operation time by comparing a location ($x_1$, $y_1$) of the fusion target vehicle detected at a first time and a location ($x_2$, $y_2$) of the fusion target vehicle detected at a second time after the operation time from the first time, calculate the speed ($v_X$, $v_Y$) of the fusion target vehicle by dividing the calculated movement distance by the operation time, and calculate the acceleration (longitudinal acceleration $a_X$, and transverse acceleration $a_Y$) of the fusion target vehicle by dividing the calculated speed ($v_X$, $v_Y$) by the operation time.

Thereafter, the controller may determine whether the acceleration ($a_X$) of the fusion target vehicle with respect to the longitudinal direction is 0 in S372 and determine whether the acceleration ($a_Y$) of the fusion target vehicle with respect to the transverse direction is 0 in S373a or S373b.

When it is determined that the acceleration ($a_X$) of the fusion target vehicle with respect to the longitudinal direction is 0 (YES) and the acceleration ($a_Y$) of the fusion target vehicle with respect to the transverse direction is 0 (YES), the controller may calculate a time of collision ($TTC_X$) with the fusion target vehicle with respect to the longitudinal direction based on equation (1) below in S374a and calculate a time of collision ($TTC_Y$) with the fusion target vehicle with respect to the transverse direction based on equation (2) below in S375a.

$$TTC_X = -(x)/v_X \quad \text{equation (1)}$$

In equation (1), x denotes a longitudinal direction from the driver's vehicle and $v_X$ denotes a speed of the fusion target vehicle with respect to the longitudinal direction.

$$TTC_Y = -(y)/v_Y \quad \text{equation (2)}$$

In equation (2), y denotes a transverse direction from the driver's vehicle and $v_Y$ denotes a speed of the fusion target vehicle with respect to the transverse direction.

Unlike this, when it is determined that the acceleration ($a_X$) of the fusion target vehicle with respect to the longitudinal direction is 0 (YES) and the acceleration ($a_Y$) of the fusion target vehicle with respect to the transverse direction is not 0 (NO), the controller may calculate the time of collision ($TTC_X$) with the fusion target vehicle with respect to the longitudinal direction based on equation (1) below in S374b and calculate the time of collision ($TTC_Y$) with the fusion target vehicle with respect to the transverse direction based on equation (3) below in S375b.

$$TTC_Y = (-v_Y + \sqrt{v_Y^2 - 2*a_Y*y})/a_Y \quad \text{equation (3)}$$

Unlike this, when it is determined that the acceleration ($a_X$) of the fusion target vehicle with respect to the longitudinal direction is not 0 (NO) and the acceleration ($a_Y$) of the fusion target vehicle with respect to the transverse direction is 0 (YES), the controller may calculate the time of collision ($TTC_X$) with the fusion target vehicle with respect to the longitudinal direction based on equation (4) below in S374c and calculate the time of collision ($TTC_Y$) with the fusion target vehicle with respect to the transverse direction based on equation (2) below in S375c.

$$TTC_X = (-x + \sqrt{v_X^2 - 2*a_X*x})/a_X \quad \text{equation (4)}$$

In equations (1) to (4) described above, a negative (−) sign may mean that a time spent for collision with the fusion target vehicle becomes positive in consideration of a direction of the speed (v) of the fusion target vehicle. More specifically, the driver's vehicle and the fusion target vehicle are on an x axis based on a Cartesian coordinate system. When the fusion target vehicle moves in a direction approaching the driver's vehicle, the speed may include a negative (−) sign such as $-v_X$ and the time spent for collision with the fusion target vehicle may be calculated as a positive value. Meanwhile, when the time spent for collision with the fusion target vehicle is a negative value, it may mean a case to be not considered (for example, a case where the fusion target vehicle passes by the driver's vehicle).

Unlike this, when it is determined that the acceleration ($a_X$) of the fusion target vehicle with respect to the longitudinal direction is not 0 (NO) and the acceleration ($a_Y$) of the fusion target vehicle with respect to the transverse direction is not 0 (NO), the controller may calculate the time of collision ($TTC_X$) with the fusion target vehicle with respect to the longitudinal direction based on equation (4) below in S374d and calculate the time of collision ($TTC_Y$) with the fusion target vehicle with respect to the transverse direction based on equation (3) below in S375d.

Equations (1) to (4) described above may be inferred from equation (5) corresponding to constant acceleration equations.

$$v = v_0 + a*t$$

$$s = v_0 + (1/2)*a*t^2$$

$$v_1^2 - v_0^2 = -2*a*s \quad \text{equation (5)}$$

In equation (5), v denotes a speed, $v_0$ and $v_1$ denote an initial speed and a later speed, respectively, a denotes an acceleration, t denotes a time, and s denotes a movement distance of a target vehicle.

That is, equations for time may be calculated through three simultaneous equations in equation (5). Equations (1) and (2) may be calculated when acceleration a is 0, and equations (3) and (4) may be calculated when acceleration a is not 0. However, while equation (5) does not consider an axis component, equations (1) to (4) may consider the axis component (x, y).

As described above, based on the acceleration (ax) of the fusion target vehicle with respect to the longitudinal direction and the acceleration (ay) of the fusion target vehicle with respect to the transverse direction, the collision preventing apparatus according to the present embodiment may calculate the collision time (TTCx) with respect to the longitudinal direction and the collision time ($TTC_Y$) with respect to the transverse direction, but the collision time ($TTC_X$, $TTC_Y$) with respect to the longitudinal direction/transverse direction may be calculated based on different equations when the acceleration (ax, ay) of the fusion target vehicle with respect to the longitudinal direction and the transverse direction is 0 and is not 0.

Accordingly, it is possible to accurately calculate an expected collision time of the fusion target vehicle with respect to the driver's vehicle and to operate a warning device or a braking system at a proper time based on the expected collision time.

Since a more detailed description may depart from the purpose of the present invention, it is omitted.

When the time of collision with the fusion target vehicle is calculated through step S370, the controller may determine whether the time of collision with the fusion target vehicle is within a preset threshold time in S380 and, when it is determined as YES, may make a control to operate the warning display device, the alarm output device, or the braking system included in the driver's vehicle in S390.

In step S380, the controller may determine whether the collision time with respect to the longitudinal direction is within a threshold time and determine whether the collision time with respect to the transverse direction is within a threshold time. In this case, when the collision time with respect to the longitudinal direction is within the threshold time and the collision time with respect to the transverse direction is within the threshold time, it may be determined as YES and step S390 may be performed.

Here, the determination of YES in step S380 may mean that there is a risk of collision with the fusion target vehicle. Accordingly, the controller may allow the driver of the driver's vehicle to recognize the collision risk by making a control to operate the warning display device or the alarm output device or may directly protect the driver's vehicle from the risk of collision with the fusion target vehicle by making a control to operate the braking system.

As illustrated in FIG. 3, when performing step S1 including steps S380 and S390, the controller compares the collision time with one threshold time, but the collision time may be compared with three subdivided threshold times.

It will be described in detail with reference to FIG. 5.

Figure 5:
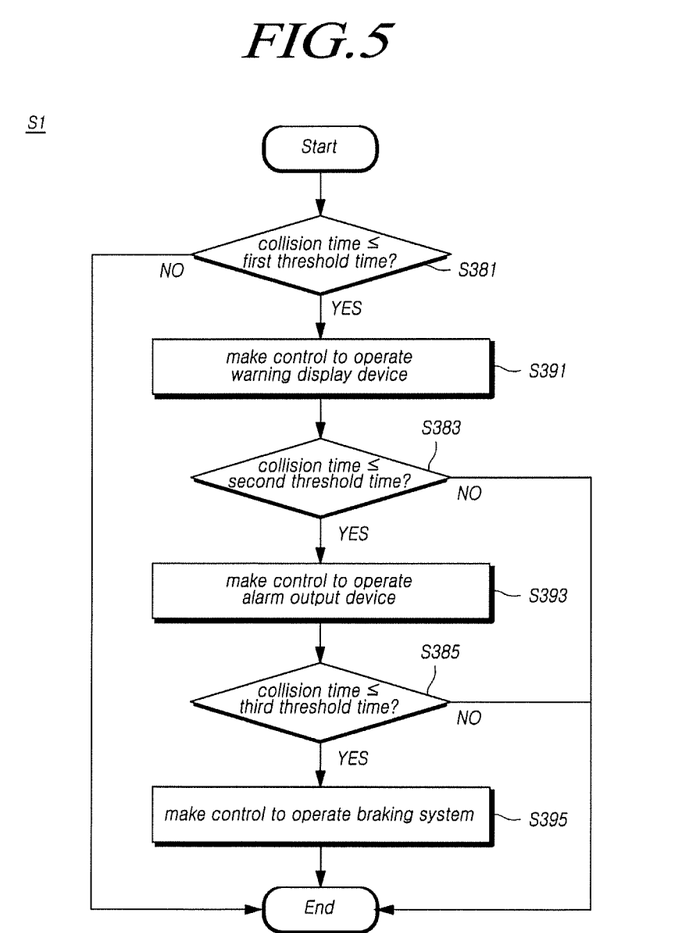
FIG. 5 illustrates another example for describing the operation of the controller according to an embodiment of the present invention.

FIG. 5 illustrates another example for describing an operation of the controller according to an embodiment of the present invention.

Referring to FIG. 5, when the controller determines whether a time of collision with the fusion target vehicle is within a preset first threshold time in S381 and it is determined as YES, the controller may make a control to operate a warning display device included in the driver's vehicle in S391.

Thereafter, the controller determines whether the time of collision with the fusion target vehicle is within a preset second threshold time in S383 and, when it is determined as YES, may make a control to operate an alarm output device included in the driver's vehicle in S393. The second threshold time may be a time shorter than the first threshold time of step S381.

Thereafter, the controller determines whether the time of collision with the fusion target vehicle is within a preset third threshold time in S385 and, when it is determined as YES, may make a control to operate a braking system included in the driver's vehicle in S395. The third threshold time may be a time shorter than the second threshold time of step S383.

In FIG. 5, the first threshold time, the second threshold time, and the third threshold time may be times set according to a risk of collision with another vehicle, wherein the first threshold time may have a low collision risk and the third threshold time may have a high collision risk. These three steps of threshold times may be set through an experiment.

Based on the collision preventing apparatus according to an embodiment of the present invention described through FIGS. 3 to 5, there is an effect of preventing the head-on parked driver's vehicle from colliding with another moving vehicle while the driver's vehicle is pulled out.

Figure 6:
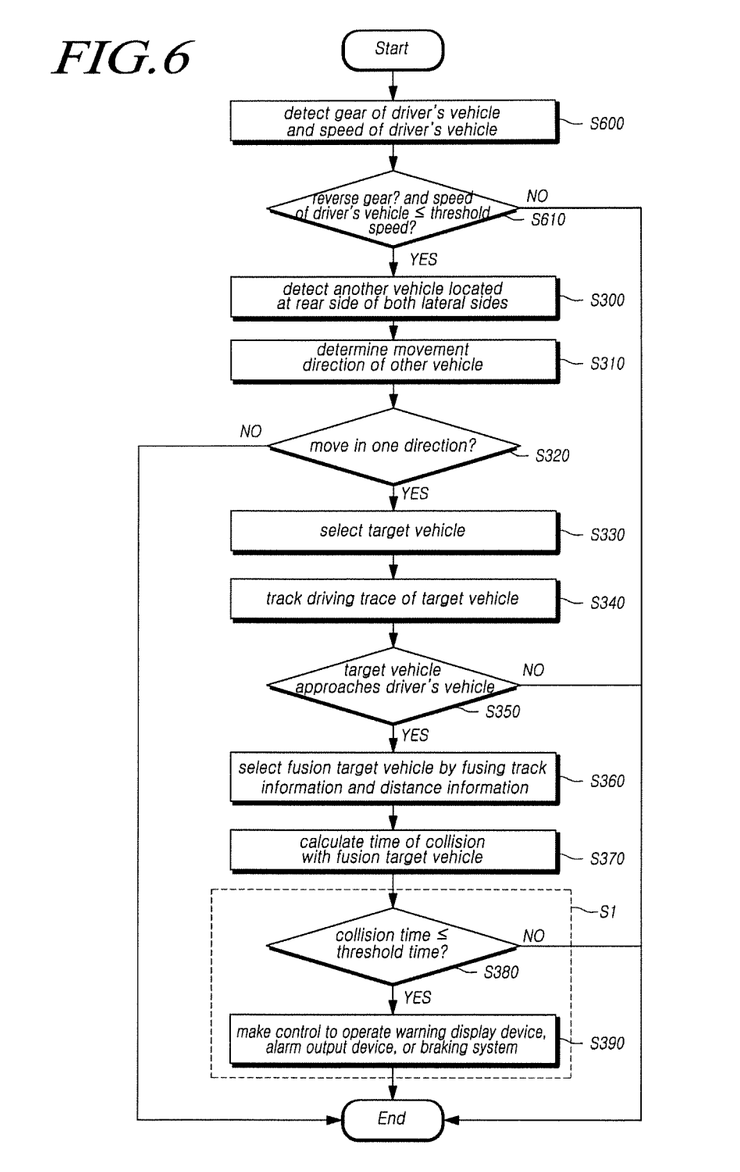
FIG. 6 illustrates an example for describing an operation of the collision preventing apparatus according to the other embodiment of the present invention.

FIG. 6 illustrates an example for describing an operation of the collision preventing apparatus according to another embodiment of the present invention.

Referring to FIG. 6, the detection unit of the collision preventing apparatus according to another embodiment of the present invention may detect a gear of the driver's vehicle through a gear sensor and detect a speed of the driver's vehicle through a vehicle speed sensor in S600. The speed of the driver's vehicle may be a speed based on the front of the driver's vehicle.

Thereafter, the detection unit may determine whether the detected gear of the driver's vehicle is a reverse gear and whether the detected speed of the driver's vehicle is equal to or lower than a threshold speed in S610. The threshold speed may be 0 [m/s].

When it is determined that the gear of the driver's vehicle is the reverse gear and the detected speed of the driver's vehicle is equal to or lower than the threshold speed (YES) in step S610, steps S300 to S390 may be performed. Steps S300 to S390 may be the same as the order described using FIGS. 3 to 5.

That is, the collision preventing apparatus according to another embodiment of the present invention that operates according to a method illustrated in FIG. 6 may further perform steps S600 and S610 and thus may operate only when the driver's vehicle moves backwardly.

Hereinafter, a collision preventing method corresponding to the operation performed by the collision preventing apparatus described using FIGS. 1 to 6 will be briefly described.

Figure 7:
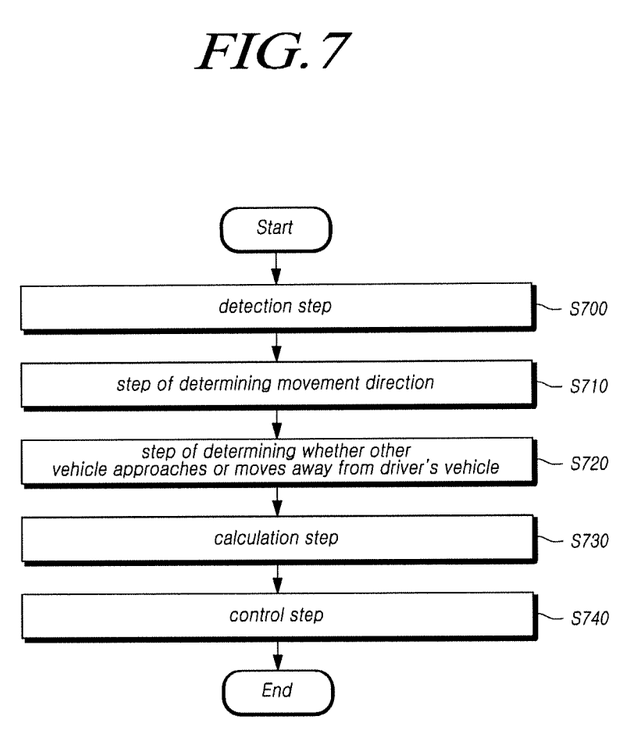
FIG. 7 is a flowchart illustrating a collision preventing method according to the embodiment of the present invention.

FIG. 7 is a flowchart illustrating a collision preventing method according to an embodiment of the present invention.

Referring to FIG. 7, a collision preventing method according to an embodiment of the present invention may include step S700 of detecting another vehicle located at a rear side of both lateral sides by using a detection sensor including one or more radar sensors 111 disposed at a rear side of a driver's vehicle to monitor the rear side of both lateral sides thereof and using one or more ultrasonic sensors 113 disposed on a rear side of the driver's vehicle to monitor the rear side of both lateral sides thereof, step S710 of determining a movement direction of the other vehicle based on the detected location, a determination step S720 of selecting the other vehicle that moves in one direction including a transverse direction from the driver's vehicle as a target vehicle, and determining whether the target vehicle approaches or moves away from the driver's vehicle by tracking a driving trace of the target vehicle, and a controller 130 for, when it is determined that the target vehicle approaches the driver's vehicle, selecting a fusion target vehicle by fusing track information of the other vehicle by output values of the radar sensors and distance information of the other vehicle by output values of the ultrasonic sensors, step S730 of calculating a time of collision with the fusion target vehicle, and step S740 of, when the time of collision is within a preset threshold time, making a control to operate a warning display device 140, an alarm output device 150, or a braking system 160.

The radar sensor used in detection step S700 corresponds to a device that may transmit an electromagnetic wave and analyze an electromagnetic wave reflected and returned from an object, so as to measure a distance from the object. When the radar sensors use a low frequency having a long wavelength, propagation attenuation is small and a remote search is possible, but accurate measurement is not possible, so that a resolution becomes bad. However, when the radar sensors use a high frequency having a short wavelength, propagation attenuation is large due to easy absorption in or reflection from vapor in the air, snow, rain, and the like, so that a remote search is not possible but a high resolution can be acquired. According to such characteristics, when it is required to quickly discover a remote target through an air radar or a ground radar, radio waves of a low frequency are used. However, when it is required to precisely measure a form or a size of a target through a fire-control radar, radio waves of a high frequency are used.

The ultrasonic sensors are devices that may have difficulty in generating a diffraction phenomenon and easily create a shadow of an object due to a characteristic that a wavelength becomes shorter as the number of vibrations becomes larger, and may detect a distance, a location, and a direction of the object based on a characteristic of ultrasonic waves evenly transferred in one direction such as light. In order to detect a distance, the ultrasonic sensors may detect a distance from an object based on a time taken for ultrasonic waves of a pulse waveform to be transmitted and then returned.

In a detection step S700 according to an embodiment of the present invention, it is possible to detect another vehicle that approaches from the rear side of both lateral sides by installing the radar sensors and the ultrasonic sensors that may operate as described above at the rear side of the driver's vehicle to monitor the rear side of both lateral sides.

However, in a later process, the rear side of both lateral sides monitored by the radar sensors and the ultrasonic sensors may be designed to use output values of the radar sensors and output values of the ultrasonic sensors.

The radar sensors have a limitation in that a non-detected short-distance area may occur since the radar sensors have an excellent detection performance for a remotely located object but may generate a large error for a closely located object.

In contrast, the ultrasonic sensors may have a characteristic opposite to the characteristic of the radar sensors. Based on the characteristics, the aforementioned limitation can be compensated for through the installation of the two radar sensors to monitor the rear side of one lateral side 211 and the rear side of the other lateral side 212 and the installation of the four ultrasonic sensors to monitor the first lateral rear side 215, the second lateral rear side 216, the third lateral rear side 217, and the fourth lateral rear side 218 as illustrated in FIG. 2. The two radar sensors may be installed and the four ultrasonic sensors may be installed as illustrated, but the present invention is not limited thereto. That is, three or more radar sensors rather than the two radar sensors may be used, and two or more ultrasonic sensors rather than the four ultrasonic sensors may be used.

Accordingly, in detection step S700, the existence and the location of another vehicle may be detected through the radar sensors and the ultrasonic sensors.

In step S710 of determining the movement direction according to an embodiment of the present invention, the movement direction of the other vehicle detected based on the location of the other vehicle detected in detection step S700 may be determined. For example, in step S710 of determining the movement direction, it may be determined that the other vehicle moves in a longitudinal direction when an x value corresponding to a longitudinal component in the detected location of the other vehicle becomes close to or away from the x value of the driver's vehicle, it may be determined that the other vehicle moves in a transverse direction when a y value corresponding to a transverse component in the location of the other vehicle becomes close to or away from the y value of the driver's vehicle, and it may be determined that the other vehicle moves in the longitudinal direction and the transverse direction when the x value in the location of the other vehicle becomes close to or away from the x value of the driver's vehicle and the y value in the location of the other vehicle becomes close to or away from the x value and the y value of the driver's vehicle.

In step S720 of determining whether the other vehicle approaches or moves away from the driver's vehicle, the other vehicle that moves in one direction including the transverse direction from the driver's vehicle may be selected as a target vehicle and it may be determined whether the target vehicle approaches or moves away from the driver's vehicle by tracking a driving trace of the selected target vehicle.

For example, in step S720 of determining whether the target vehicle approaches or moves away from the driver's vehicle, a first vehicle and a second vehicle that are other vehicles moving in one direction including the transverse direction from the driver's vehicle based on the movement direction determined in step S710 are selected as target vehicles, and it may be determined whether the first target vehicle and the second target vehicle approach or move away from the driver's vehicle by tracking a driving trace of the selected first target vehicle and a driving trace of the selected second target vehicle.

Alternatively, in step S720 of determining whether the target vehicle approaches or moves away from the driver's vehicle, it may be determined whether the target vehicle approaches or moves away from the driver's vehicle based on a relative speed of the other vehicle calculated based on the location of the other vehicle detected in step S700. For example, when the relative speed of the first vehicle moving in a direction, which is not the direction toward the driver's vehicle, is positive, it may be determined that the first vehicle moves away from the driver's vehicle in step S720 of determining whether the target vehicle approaches or moves away from the driver's vehicle. In contrast, when the relative speed of the second vehicle moving toward the driver's vehicle is positive, it may be determined that the second target vehicle approaches the driver's vehicle in step S720 of determining whether the target vehicle approaches or moves away from the driver's vehicle.

In calculation step S730 according to an embodiment of the present invention, when it is determined that the target vehicle approaches the driver's vehicle, a fusion target vehicle may be selected by fusing track information of the other vehicle by output values of the radar sensors and distance information of the other vehicle by output values of the ultrasonic sensors and a time of collision with the fusion target vehicle may be calculated.

The track information of the other vehicle uses the output values of the radar sensors based on a characteristic of the radar sensors corresponding to a remote detection, and the distance information of the other vehicle uses the output values of the ultrasonic sensors based on a characteristic of the ultrasonic sensors 113 corresponding to an accurate detection of a short-distance object, but the present invention is not limited thereto. In calculation step S730, the target vehicle, of which the track information of the other vehicle corresponds to a direction toward the driver's vehicle and of which the distance information of the other vehicle is within a predetermined distance from the driver's vehicle, may be selected as the fusion target vehicle and the time of collision with the selected fusion target vehicle may be calculated. The fusion target vehicle may be accurately detected using the output values of the radar sensors and the output values of the ultrasonic sensors.

For example, in calculation step S730, the time of collision with the fusion target vehicle may be calculated through the performance of steps illustrated in FIG. 4.

In control step S740 according to an embodiment of the present invention, when the calculated time of collision is within a preset threshold time, a warning display device, an alarm output device, or a braking system may be controlled to operate. The threshold time may be a time spent for pulling out the other parked vehicle.

For example, when the calculated collision time is within the threshold time as the fusion target vehicle moves at a high speed, a risk of collision with the other vehicle may be informed of to the driver of the driver's vehicle by making a control to operate the warning display device or the alarm output device in control step S740. Alternatively, in control step S740, by making a control to operate the braking system, the driver's vehicle may not be pulled out.

More specifically, in control step S740, a time of collision with the fusion target vehicle with respect to a longitudinal direction (a forward and backward direction of the driver's vehicle) from the driver's vehicle and a time of collision with the fusion target vehicle with a transverse direction (a direction perpendicular to the longitudinal direction) may be calculated. When the time of collision with the fusion target vehicle with respect to the longitudinal direction is within a longitudinal threshold time and the time of collision with the fusion target vehicle with respect to the transverse direction is within a transverse threshold time, the warning display device, the alarm output device, or the braking system may be controlled to be operated in the control step.

Further, in control step S740, when controlling the operation of the warning display device, the alarm output device, or the braking system, orders thereof may be decided.

For example, in control step S740, the warning display device may be controlled to operate when the calculated collision time is within a preset first threshold time, the alarm output device may be controlled to operate when the collision time is within a second threshold time shorter than the first threshold time, and the braking system may be controlled to operate when the collision time is within a third threshold time shorter than the second threshold time. The first threshold time, the second threshold time, and the third threshold time correspond to times set according to a risk of collision with another vehicle, wherein the first threshold time may have a low collision risk and the third threshold time may have a high collision risk.

Here, the warning display device corresponds to a device for providing a visual notification to a driver and passengers of the vehicle and may be a lamp giving a light source or a display that may provide an image, the alarm output device may be a device for providing an auditory notification to the driver and passengers of the vehicle, and the braking system corresponds to a device for reducing a speed of the vehicle and may be a brake Further, prior to the operation based on the collision preventing method according to an embodiment of the present invention, a gear of the driver's vehicle may be detected through a gear sensor included in the driver's vehicle and a speed of the driver's vehicle may be detected through a vehicle speed sensor. Then, a reverse gear may be detected and, when the speed of the driver's vehicle is equal to or lower than a preset threshold speed, the operation based on the collision preventing method according to an embodiment of the present invention may be performed.

This is to operate based on the collision preventing method according to an embodiment of the present invention only when the driver's vehicle moves backwardly (including a case where the head-on parked driver's vehicle is pulled out).

That is, when the reverse gear is engaged and the forward speed is equal to or lower than 0, it may be determined that the driver's vehicle moves backwardly and thus the operation based on the collision preventing method according to an embodiment of the present invention may be performed.

As described above, the collision preventing method according to the present invention has an effect of preventing a collision with another moving vehicle while the head-on parked driver's vehicle is pulled out.

Further, the collision preventing method according to the present invention may perform each of the entire operations performed by the collision preventing apparatus according to the present invention described based on FIGS. 1 to 6.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An apparatus for preventing a collision, the apparatus comprising:
   a detection unit configured to detect another vehicle located at a rear side of both lateral sides through a detection sensor including one or more radar sensors disposed at a rear side of a driver's vehicle to monitor a first rear side of both lateral sides and one or more ultrasonic sensors disposed at the rear side of the driver's vehicle to monitor one or more second rear sides of both lateral sides;
   a determination unit configured to determine a movement direction of the other vehicle based on the location, select the other vehicle that moves in one direction including a transverse direction from the driver's vehicle as a target vehicle, and determine whether the target vehicle approaches or moves away from the driver's vehicle by tracking a driving trace of the target vehicle; and a controller configured to, when it is determined that the target vehicle approaches the driver's vehicle, select a fusion target vehicle based on track information of the other vehicle by output values of the radar sensors and distance information of the other vehicle by output values of the ultrasonic sensors, calculate a time of collision with the fusion target vehicle and, when the collision time is within a preset threshold time, make a control to operate one or more of a warning display device, an alarm output device, and a braking system, wherein the first rear side monitored by the one or more radar sensors correspond to the one or more second rear sides monitored by the one or more ultrasonic sensors, and wherein, the controller is further configured to generate a warning in a stepwise manner such that:
the warning display device is operated when the time of collision is within a first threshold time;
the alarm output device is operated in response to the time of collision being within a second threshold time which is shorter than the first threshold time; and
the braking system is operated when the time of collision is within a third threshold time which is shorter than the second threshold time.

2. The apparatus of claim 1, wherein the controller calculates a time of collision with the fusion target vehicle with respect to a longitudinal direction and a time of collision with respect to a transverse direction from the driver's vehicle, and
wherein when the time of collision with respect to the longitudinal direction is within a longitudinal threshold time and the time of collision with respect to the transverse direction is within a transverse threshold time, makes a control to operate one or more of the warning display device, the alarm output device, and the braking system.

3. The apparatus of claim 1, wherein the controller calculates a time of collision with respect to a longitudinal direction and a time of collision with respect to a transverse direction based on an acceleration of the fusion target vehicle with respect to the longitudinal direction of the driver's vehicle and an acceleration of the fusion target vehicle with respect to the transverse direction of the driver's vehicle.

4. The apparatus of claim 3, wherein the controller calculates the time of collision with respect to the longitudinal direction and the time of collision with respect to the transverse direction based on different equations when the acceleration of the fusion target vehicle with respect to the longitudinal direction of the driver's vehicle and the acceleration of the fusion target vehicle with respect to the transverse direction of the driver's vehicle are 0 and when the acceleration of the fusion target vehicle with respect to the longitudinal direction of the driver's vehicle and the acceleration of the fusion target vehicle with respect to the transverse direction of the driver's vehicle are not 0.

5. The apparatus of claim 1, wherein the detection unit detects a gear state of the driver's vehicle through a gear sensor and a speed of the driver's vehicle through a vehicle speed sensor and, when the gear state corresponds to a reverse gear state and the speed of the driver's vehicle is equal to or lower than a preset threshold speed, detects the other vehicle through the detection sensor.

6. The apparatus of claim 1, wherein the controller selects a target vehicle, of which track information of the other vehicle measured by the radar sensors corresponds to a direction toward the driver's vehicle and of which distance information of the other vehicle measured by the ultrasonic sensors is within a predetermined distance from the driver's vehicle, as a fusion target vehicle.

7. The apparatus of claim 1, wherein the determination unit determines whether the other vehicle approaches or moves away from the driver's vehicle based on a relative speed of the other vehicle calculated based on the location of the other vehicle.

8. A method of preventing collision, the method comprising:
detecting another vehicle located at a rear side of both lateral sides through a detection sensor including one or more radar sensors disposed at a rear side of a driver's vehicle to monitor a first rear side of both lateral sides and one or more ultrasonic sensors disposed at the rear side of the driver's vehicle to monitor one or more second rear sides of both lateral sides;
determining a movement direction of the other vehicle based on the location;
selecting the other vehicle that moves in one direction including a transverse direction from the driver's vehicle as a target vehicle and determining whether the target vehicle approaches or moves away from the driver's vehicle by tracking a driving trace of the target vehicle;
when it is determined that the target vehicle approaches the driver's vehicle, selecting a fusion target vehicle based on track information of the other vehicle by output values of the radar sensors and distance information of the other vehicle by output values of the ultrasonic sensors, and calculating a time of collision with the fusion target vehicle; and
when the collision time is within a preset threshold time, making a control to operate one or more of a warning display device, an alarm output device, and a braking system,
wherein the first rear side monitored by the one or more radar sensors correspond to the one or more second rear sides monitored by the one or more ultrasonic sensors, and
wherein the making a control comprises generating a warning in a stepwise direction such that:
the warning display device is operated when the time of collision is within a first threshold time;
the alarm output device is operated in response to the time of collision being within a second threshold time which is shorter than the first threshold time; and
the braking system is operated when the time of collision is within a third threshold time which is shorter than the second threshold time.

9. The method of claim 8, wherein the making the control comprises calculating a time of collision with the fusion target vehicle with respect to a longitudinal direction and a time of collision with respect to a transverse direction from the driver's vehicle, and
wherein when the time of collision with respect to the longitudinal direction is within a longitudinal threshold time and the time of collision with respect to the transverse direction is within a transverse threshold time, making a control to operate one or more of the warning display device, the alarm output device, and the braking system.

10. The method of claim 8, wherein the making the control comprises calculating a time of collision with respect to a longitudinal direction and a time of collision with respect to a transverse direction based on an acceleration of the fusion target vehicle with respect to the longitudinal direction of the driver's vehicle and an acceleration of the fusion target vehicle with respect to the transverse direction of the driver's vehicle.

11. The method of claim 10, wherein the making the control comprises calculating the time of collision with respect to the longitudinal direction and the time of collision with respect to the transverse direction based on different equations when the acceleration of the fusion target vehicle with respect to the longitudinal direction of the driver's vehicle and the acceleration of the fusion target vehicle with respect to the transverse direction of the driver's vehicle are 0 and when the acceleration of the fusion target vehicle with respect to the longitudinal direction of the driver's vehicle and the acceleration of the fusion target vehicle with respect to the transverse direction of the driver's vehicle are not 0.

12. The method of claim 8, wherein the detecting, of the other vehicle comprises detecting a gear state of the driver's vehicle through a gear sensor and a speed of the driver's vehicle through a vehicle speed sensor and, when the gear state corresponds to a reverse gear state and the speed of the driver's vehicle is equal to or lower than a preset threshold speed, detecting the other vehicle through the detection sensor.

13. The method of claim 8, wherein the making the control comprises selecting a target vehicle, of which track information of the other vehicle measured by the radar sensors corresponds to a direction toward the driver's vehicle and of which distance information of the other vehicle measured by the ultrasonic sensors is within a predetermined distance from the driver's vehicle, as a fusion target vehicle.

* * * * *